(12) United States Patent
Rantala et al.

(10) Patent No.: US 11,218,961 B2
(45) Date of Patent: Jan. 4, 2022

(54) POWER SAVING FOR WIRELESS DEVICE

(71) Applicant: Nokia Technologies Oy, Espoo (FI)

(72) Inventors: Enrico Rantala, Berkeley, CA (US);
Mika Kasslin, Espoo (FI); Janne Marin, Espoo (FI); Olli Alanen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/769,155

(22) PCT Filed: Jan. 4, 2019

(86) PCT No.: PCT/FI2019/050005
§ 371 (c)(1),
(2) Date: Jun. 2, 2020

(87) PCT Pub. No.: WO2019/138157
PCT Pub. Date: Jul. 18, 2019

(65) Prior Publication Data
US 2020/0344684 A1 Oct. 29, 2020

Related U.S. Application Data

(60) Provisional application No. 62/617,390, filed on Jan. 15, 2018.

(51) Int. Cl.
*H04W 52/02* (2009.01)
*H04W 8/00* (2009.01)
*H04W 48/16* (2009.01)

(52) U.S. Cl.
CPC ....... *H04W 52/0212* (2013.01); *H04W 8/005* (2013.01); *H04W 48/16* (2013.01); *H04W 52/0235* (2013.01)

(58) Field of Classification Search
CPC . H04W 52/0212; H04W 8/005; H04W 48/16; H04W 52/0235; H04W 72/0446;
(Continued)

(56) References Cited

U.S. PATENT DOCUMENTS 8,471,525 B2   6/2013  Kim et al.
9,191,891 B2  11/2015  Jafarian et al.
(Continued)

FOREIGN PATENT DOCUMENTS

WO    2018/056878 A1    3/2018
WO    2019/139627 A1    7/2019

OTHER PUBLICATIONS

"Neighbor Awareness Networking Technical Specification", Wi-Fi Alliance, Version 2.0, 2017, pp. 1-184.
(Continued)

*Primary Examiner* — Diane D Mizrahi
(74) *Attorney, Agent, or Firm* — Nokia Technologies Oy

(57) ABSTRACT

According to an example aspect of the present invention, there is provided a method, comprising: establishing, via a main radio, a data link schedule comprising a plurality of communication resource periods for a data link between a first wireless device and a second wireless device, wherein at least a sub-set of the plurality of communication resource periods are scheduled to start periodically, pausing data transmission by transferring, via the main radio, a control message during a communication resource period of the data link schedule, entering the power save mode in response to transferring the control message, maintaining the power save mode over at least one further communication resource period of the data link schedule, and transmitting a wake-up frame, via a wake-up radio different from the main radio, in response to detecting need for further data transmission during the data link schedule.

20 Claims, 5 Drawing Sheets

(58) Field of Classification Search
CPC ..... H04W 52/02; H04W 76/28; H04W 84/12; H04W 28/021; Y02D 30/70
See application file for complete search history.

(56) References Cited

U.S. PATENT DOCUMENTS

| | | |
|---|---|---|
| 9,648,485 B2 | 5/2017 | Abraham et al. |
| 9,736,779 B2 | 8/2017 | Min et al. |
| 2014/0112226 A1 | 4/2014 | Jafarian et al. |
| 2018/0109952 A1* | 4/2018 | Abraham .............. H04L 63/065 |

OTHER PUBLICATIONS

International Search Report and Written Opinion received for corresponding Patent Cooperation Treaty Application No. PCT/FI2019/050005, dated Mar. 8, 2019, 14 pages.
Extended European Search Report received for corresponding European Patent Application No. 19738131.2, dated Sep. 17, 2021, 8 pages.

* cited by examiner

POWER SAVING FOR WIRELESS DEVICE

RELATED APPLICATION

This application was originally filed as PCT Application No. PCT/FI2019/050005, filed on Jan. 4, 2019, which claims priority from U.S. Provisional Application No. 62/617,390, filed Jan. 15, 2018.

FIELD

The present invention relates to wireless communications, and in particular to facilitating improved power saving for wireless devices.

BACKGROUND

Various power-saving mechanisms have been developed for wireless devices to allow a battery-operated device to "sleep" or enter an inactive mode between data transmissions or when there is no data to transfer.

Wireless devices may have a power save mode where a wireless device temporarily shuts down its main radio interface to reduce power consumption. The power save mode may have to be cancelled, e.g. for receiving information from the wireless network. The information may be provided in a beacon signal or another periodic broadcast signal, for example. There may be other reasons that cancel the sleeping and cause the device to activate its main radio interface for data transmission/reception.

With the fast increase of new devices being wirelessly connected and substantial traffic growth, requirements for wireless networks and connections are also changing. There are an increasing number of locally connected wireless devices having high requirements on power-saving.

SUMMARY

The invention is defined by the features of the independent claims. Some specific embodiments are defined in the dependent claims.

According to an aspect of the present invention, there is provided a method, comprising: establishing, via a main radio, a data link schedule comprising a plurality of communication resource periods for a data link between a first wireless device and a second wireless device, wherein at least a sub-set of the plurality of communication resource periods are scheduled to start periodically, pausing data transmission by transferring, via the main radio, a control message during a communication resource period of the data link schedule, entering the power save mode in response to transferring the control message, maintaining the power save mode over at least one further communication resource period of the data link schedule, and transmitting a wake-up frame, via a wake-up radio different from the main radio, in response to detecting need for further data transmission during the data link schedule.

There are also provided apparatuses, computer programs, and computer-readable mediums configured to carry out features in accordance with the first and/or second aspect. According to an aspect, there is provided an apparatus comprising means for causing the apparatus to carry out the method of any one of the method claims.

EMBODIMENTS

Figure 1:
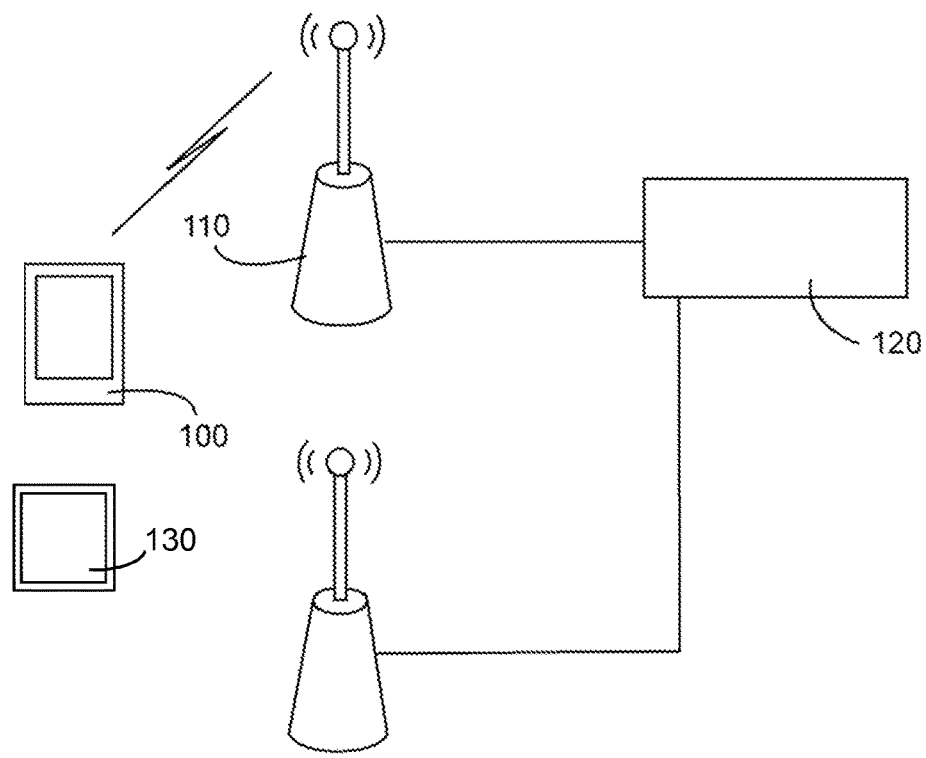
FIG. 1 illustrates a wireless communication system in which at least some embodiments of the present invention may be applied.

FIG. 1 illustrates an example wireless communication system. The wireless communication devices of FIG. 1 comprise an access point (AP) 110 and a wireless terminal device (STA) 100, 130. In case of IEEE 802.11-based wireless local area networks (WLANs), the AP 110 may be associated with a basic service set (BSS) which is a basic building block of IEEE 802.11-based WLANs. The most common BSS type is an infrastructure BSS that includes a single AP together with all STAs associated with the AP. The AP may be a fixed AP or a mobile AP. The AP 110 may also provide access to other networks, such as the Internet. In an embodiment, the plurality of BSSs may interconnect to form an extended service set (ESS). The AP 110 may be connected to further network elements 120, such as a network management system (NMS).

A terminal device 100 may establish and manage a peer-to-peer (P2P) wireless network to which one or more other terminal devices 130 may associate. In such a case, the peer-to-peer wireless network may be established between two or more terminal devices. The terminal device managing the network may operate as an access point or node providing the other terminal device(s) with a connection to other networks, such as the Internet. In other embodiments, such routing functionality is not employed and the connection terminates in the terminal devices. One example technology of P2P connectivity is Wi-Fi Neighbor Awareness Networking (NAN) by the Wi-Fi Alliance, also referred to as Wi-Fi Aware, facilitating discovery of devices and services within Wi-Fi range.

Figure 2A:
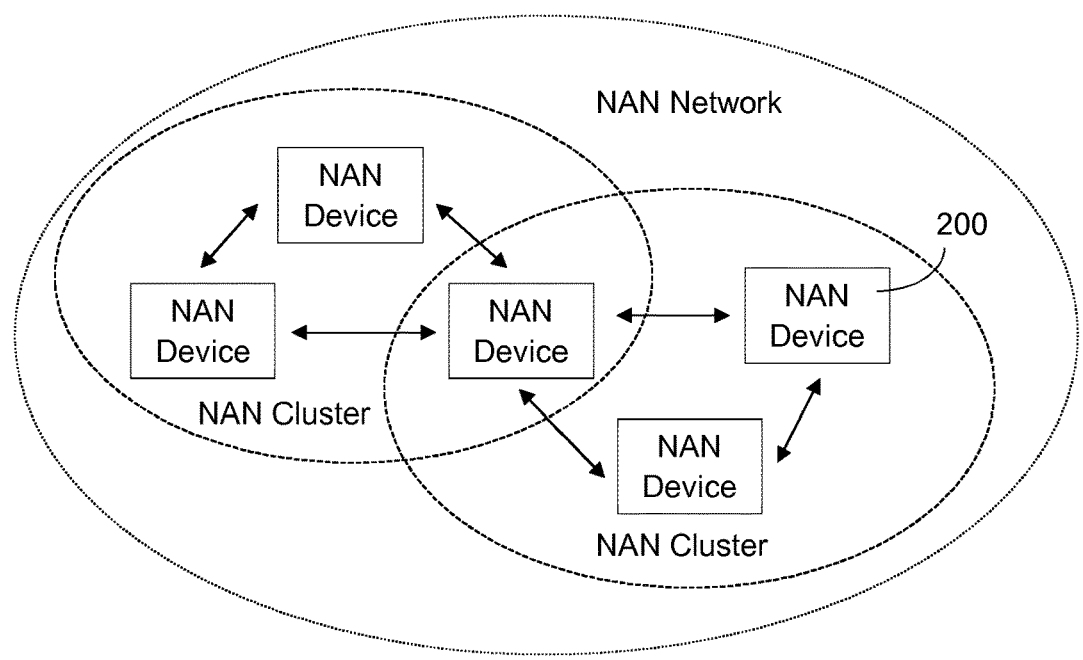
FIG. 2a illustrates a neighbour awareness networking system in which at least some embodiments of the present invention may be applied.

The purpose of NAN is to provide efficient means for discovering available services within Wi-Fi range, subscribing to a service of interest, and establishing connection between a service provider and a subscriber. FIG. 2 illustrates a NAN cluster formed by NAN devices 200. As illustrated, a NAN device may choose to participate in more than one NAN cluster, e.g. to quickly discover all services offered by the NAN devices of all NAN clusters within range.

NAN devices in a NAN cluster are synchronized so that they share common discovery window (DW) schedule during which they perform service discovery. A NAN device receives information on available services in publishing type of NAN service discovery frames (SDFs) during DW. If the service consumption requires operations like peer-to-peer ranging or data communication requiring activity outside the discovery windows, the NAN device is expected to announce time and frequency resources that it could use for those operations with an interested peer device. These resources are announced by including at least one NAN Availability attribute with at least one Potential Availability entry in the SDF.

A NAN device wishing to subscribe to a service, i.e. a subscribing device, may passively listen for NAN SDFs, e.g. NAN SDF Publish frames, with the objective to find whether some of the close-by devices have published the service one is interested in. Alternatively, the subscribing device may transmit a NAN SDF, e.g. a NAN SDF Subscribe frame, indicating its interest in the service with the objective to trigger publishing devices to transmit NAN SDFs, e.g. NAN SDF Publish frames, in which they announce availability of the service together with related configuration information.

If an interesting service is found, the subscribing device may initiate a NAN data link (NDL) and a NAN data path (NDP) setup by transmitting a corresponding NAN action frame (NAF) to the service provider who sent the SDF.

Figure 2B:
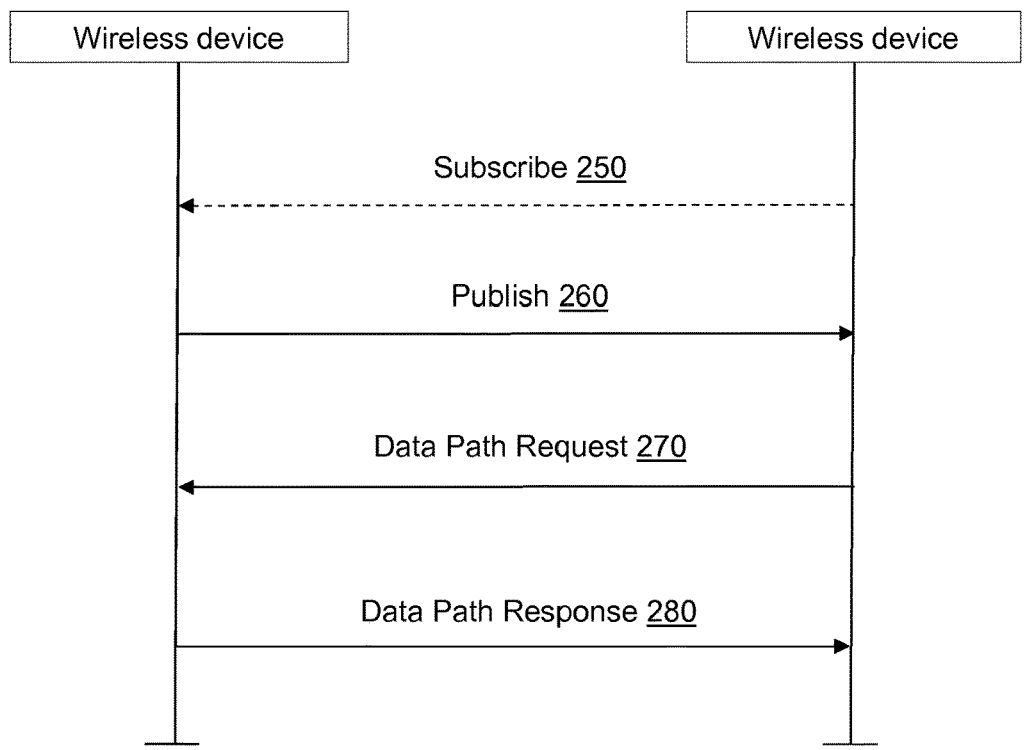
FIG. 2b illustrates data link schedule setup signalling in accordance with at least some embodiments.

FIG. 2b illustrates an example of data link schedule setup related signaling between wireless devices, such as NDP setup signaling between two NAN devices. The Subscribe frame 250 (optional) for triggering a service publishing device to send service information and the Publish frame 260 comprising service information may be embodiments of NAN SDFs, i.e. NAN SDF Subscribe and NAN SDF Publish frames, respectively. Data path establishment may be initiated by the Data Path Request 270. The service publishing device replies with the Data Path Response 280 rejecting or accepting the request. Frames 270 and 280 may be NAFs for NDP setup.

The result of NDL and NDP establishment is an NDL schedule which comprises one or more NDL common resource blocks (CRBs) that are essentially the overlapping portions of the two devices' committed availability windows. Once the NAN devices have the NDL schedule established, they have so called synchronized NAN Device Link (S-NDL) established. During S-NDL CRBs the peer devices may transmit data frames to each other. In an embodiment, the term data frame refer to a frame that can be used for transmitting end user data, e.g. application layer data, between two devices, e.g. NAN devices. The devices must be available for the whole duration of each S-NDL CRB regardless of whether there are data frames to exchange with the peer.

Services that generate data frames in bursts and with variable rate are challenging from the NDL schedule perspective. The NDL Schedule with a sequence of NDL CRBs may be long, e.g. for the entire lifetime of the NDP/NDL. This leads to time periods that could be several seconds in length when the NDL CRBs are underused due to lack of data frames to exchange with the peer. The devices need to keep awake for the whole duration of each NDL CRB. This is the case in the currently specified NAN technology.

In one scenario, data transmissions according the NDL schedule could be paused by transmitting a new type of NAF during current NDL CRB, and optionally receiving a similar NAF from the peer as an acknowledgement. If paused, then there could be a paging window in the beginning of each subsequent NDL CRB. If a trigger frame is received during the paging window, the peer devices may continue data transmissions during that NDL CRB. If a trigger frame is not received, the peer devices will wait for the next NDL CRB. This enables pausing data transmission for the remaining part of the current NDL CRB, but requires peer devices to be in an awake state at least during paging window of every NDL CRB of the NDL schedule.

Minimization of power consumption is particularly important for ultra-low-power IoT devices with local connectivity. There is now provided an improved method and apparatus for power saving applying a wake-up radio to continue communication according to the agreed data link schedule between e.g. neighbor awareness networking devices. After pausing communication according to the data link schedule, a wake-up frame (WUF) may be transmitted to the counterpart to continue using the data link schedule. An advantage is that there is no need to be awake just in case during the beginning of each communication resource period of the data link schedule, facilitating improved power saving.

Recent developments in 802.11 work groups have involved introduction of a new low-power radio interface called the wake-up radio. One purpose of the new radio interface is to enable further power-savings by allowing a main radio, which may also be referred to as a primary connectivity radio, used for data communication according to 802.11 specifications to be off for longer periods. The low-power radio may be referred to as the wake-up radio (WUR) or a low-power WUR (LP-WUR), and it is considered to be a companion radio to the main radio.

The wake-up radio interface may be designed such that it consumes less power than the main radio. The wake-up radio may employ a simpler modulation scheme than the main radio, e.g. the wake-up radio interface may use only on-off keying while the main radio uses variable modulations schemes such as phase-shift keying and (quadrature) amplitude modulation. In other embodiment, the wake-up radio may use two or more modulation schemes. The wake-up radio interface may operate on a smaller bandwidth than the smallest operational bandwidth of the main radio.

The term wake-up radio refers herein generally to a radio used to wake up a main radio primarily used for wireless data transfer. The wake-up radio may be used only for waking up the main radio of a wireless device, such as the device 100, 110, 130, 200. In some embodiments, the wake-up radio of the wireless device may comprise only a receiver or a transmitter. In other embodiments, the wireless device may have both a WUR receiver and a WUR transmitter.

When a WUR capable device disables the main 802.11 radio, it may transition from an awake mode or state to a new power-saving mode or state, separate from the existing 802.11 power-saving modes (PS mode) or states, which may also be referred to as a doze, a WUR (sleep) mode or state, or idle mode or state, for example. The main radio is off and the wake-up radio is (at least some of the time) on during such WUR mode. The wake-up radio may thus be powered on when the main radio is powered off. Thus, the WUR mode may be considered as a dormant state. In some embodiments, a non-WLAN radio may serve as the main radio. For example a cellular radio or a short-range radio such as a Bluetooth radio, may serve as the main radio.

A wireless device may be configured to support a further power-saving mode or state, such as the IEEE 802.11 PS mode. During such further power-saving mode the main radio is on/off according to the applied power-saving mechanism, and the wake-up radio may be or may not be part of the mechanism. It is to be appreciated that in some embodiments such specific further power-saving mode is not applied or there is no transition between the further power saving-mode and the WUR mode. Further, in an embodiment, the wake-up radio is always on.

Figure 3:
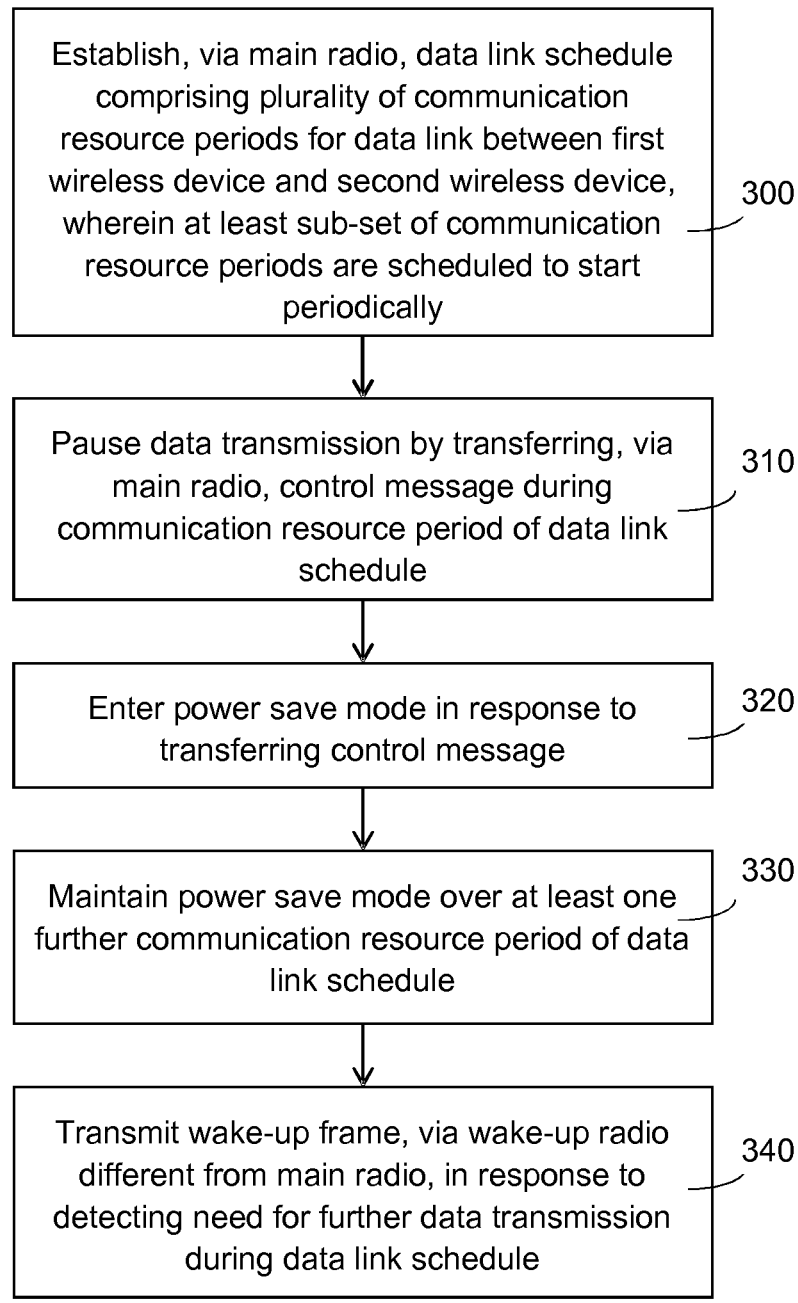
FIG. 3 illustrates a method in accordance with at least some embodiments of the present invention.

FIG. 3 illustrates a method for facilitating power saving by a wake-up radio. The method may be applied in an apparatus, which may be any type of wireless device comprising a main radio and a wake-up radio, such as an IoT device or a user device comprising an IEEE 802.11 main radio and a WUR.

The process comprises, as performed by a first wireless device: establishing 300, via a main radio, a data link schedule comprising a plurality of communication resource periods for a data link between a first wireless device and a wireless second device. At least a sub-set of the plurality of communication resource periods are scheduled to start periodically. End user data or machine-to-machine data may be transferred during at least one communication resource period of the plurality of communication resource periods after the data link schedule establishment.

Block 310 comprises pausing data transmission by transferring, via the main radio, a control message during a communication resource period of the data link schedule. Block 320 comprises entering the power save mode in response to transferring the control message. Block 330 comprises maintaining in the power save mode over at least one further communication resource period of the data link schedule, i.e. during one or more entire scheduled periods after the period in which the control message was transferred in block 310. Block 340 comprises transmitting a wake-up frame, via a wake-up radio different from the main radio, in response to detecting a need for further data transmission during the data link schedule.

The method of FIG. 3 may be carried out in an apparatus comprised by the first wireless device and configured to cause the first wireless device to carry out at least the features disclosed. Establishment of the data link schedule generally refers that the data link schedule may be requested or initiated by the first device or by the second device, and the other may respond. Pausing data transmission herein generally refers to cancelling or preventing further data transmission via the main radio (typically after there is no data pending for transmission).

The control message may refer to a message or frame for indicating or requesting pausing data transmission via the main radio, such as a specific NAN action frame causing cancelling of NAN communications via CRBs of an established NDL schedule. Transfer refers here either to transmitting or receiving. Thus, the second device may cause the first device to enter block 310 by transmitting the control message which is then received by the first device, for example. Further, it will be appreciated that the second device may carry out similar method comprising blocks 300 to 330, and in block 340 receive the wake-up frame via the wake-up radio.

The power save mode may be entered 320 before end of the communication resource period in which the control message was transferred 310. The main radio may be switched off during the power save mode. The wake-up radio may be on during at least part of the power save mode. The power save mode may refer to a new or an existing power save mode or state, such as the WUR or non-WUR mode or state indicated above. In some embodiments, the wake-up radio is switched on or allowed to transmit during the communication resource periods of the data link schedule after entering block 320.

The communication resource period may be defined by a start time, duration, and a frequency channel. A message used for establishing 300 the data link schedule may comprise wake-up radio parameters, such as one or more of wake-up radio capability indication, wake-up radio availability information, such as parameters defining time windows during which the WUF may be transmitted 340, wake-up radio channel information, and a wake-up radio identifier for transmitting the wake-up frame.

In an additional or alternative embodiment, the control message 310 may comprise wake-up radio related parameter information, such as one or more of the wake-up radio parameters mentioned above.

The first device may, in response to detecting the need for further data transmission during the data link schedule, transmit 340 to the second device the wake-up frame before a still further communication resource period of the data link schedule, which may refer to detecting the need for further data transmission and sending the wake-up frame during the same communication resource period of the data link schedule. Hence, the mode change to enable data transfer again may be triggered instantly instead of e.g. having to wait for a subsequent paging window, thus facilitating reduced delay. In an embodiment, there are no paging windows within communication resource blocks. In another embodiment, the system may comprise paging windows, thus supporting also devices that do not have a wake-up radio.

Data transmission may be continued by the first device via the main radio in accordance with the data link schedule after transmitting 340 the wake-up frame. Data transmission via the main radio may be continued by the second device in accordance with the data link schedule in response to receiving the wake-up frame after block 340 via the wake-up radio from the first device. A wake-up delay may be applied and the data transmission may be continued only after the wake-up delay.

In some embodiments, the first device and the second device are NAN (capable) devices 200. The NAN devices may comprise terminal devices and/or access points. The NAN devices may be configured to apply WUR functionality for Wi-Fi Aware for power saving in a NAN data link, some further example embodiments being illustrated below. The NAN devices may thus be configured to communicate WUR information in NAN frames or messages.

Figure 4:
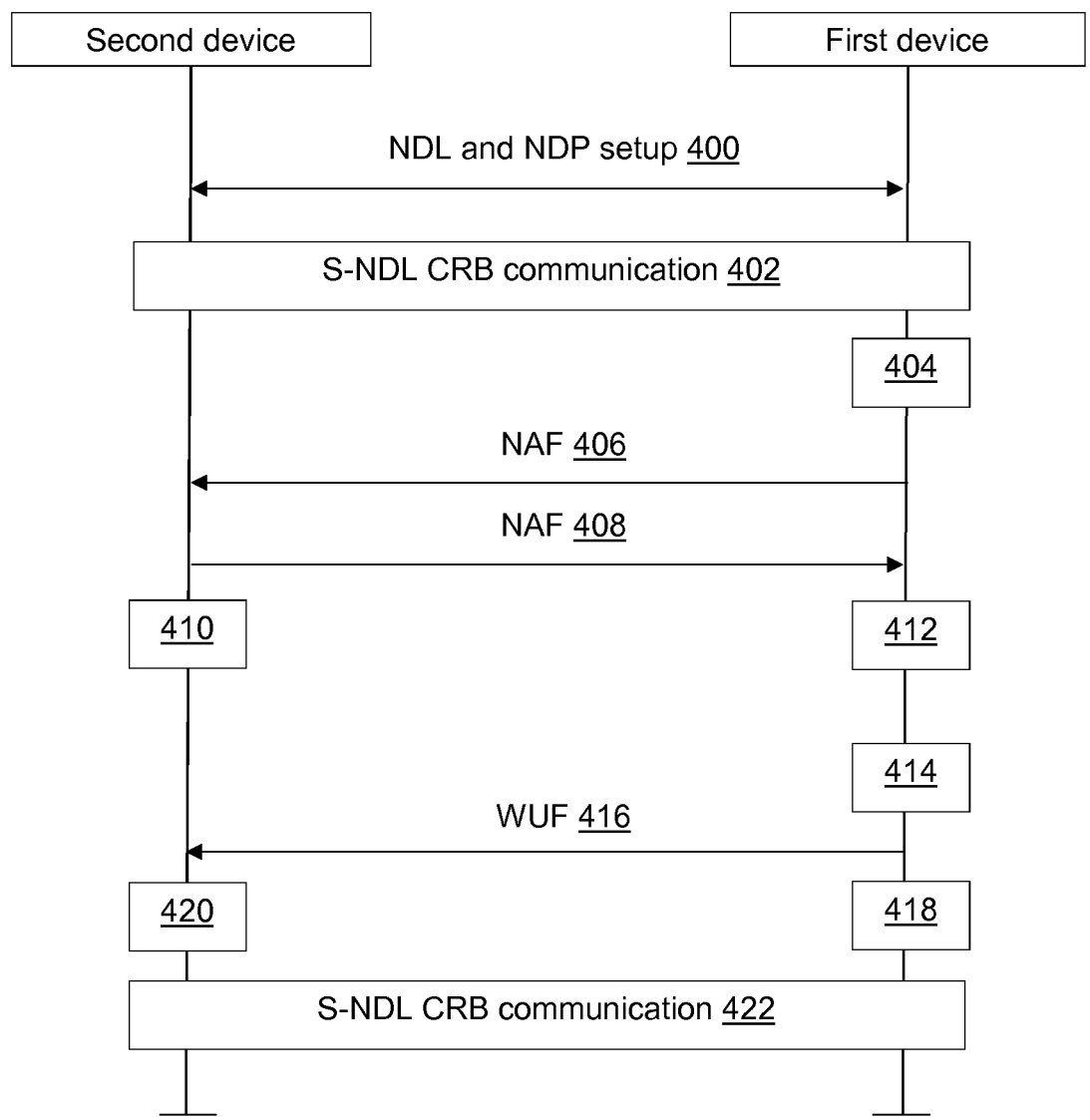
FIG. 4 illustrates a signalling example in accordance with at least some embodiments of the present invention.

Reference is made to FIG. 4 illustrating signalling between NAN devices. Thus, the data link schedule may be a NDL schedule which is setup in 400, and the communication resource period may be a NAN CRB. WUR parameter information, such as WUR capability, availability, and/or identifier, may be included in an SDF sent during a DW.

The NAN devices that are also WUR capable may be configured to indicate their WUR capability and willingness to use the WUR in the NAN context in SDF(s) transferred during the NDL setup 400. This may be carried out by setting the corresponding bit or subfield in a device capability attribute of an SDF to a value defined to represent the WUR capability. For example, one of the reserved bits of Capabilities subfield of the NAN Device Capability attribute, such as Bit 3, may be applied for WUR capability indication. The WUR capability indication may also indicate request to use WUR for power save in NDL. However, it is to be appreciated that WUR capability may be indicated in various other ways, e.g. by probe request/response signaling.

Use of the wake-up radio for transferring the wake-up frame may be enabled in the devices in response to receiving via the main radio an indication of wake-up radio capability and use of the wake-up radio for power saving. Thus, reception of such indication may be a precondition for entering block 310 and applying the WUR related features in FIG. 4.

In some embodiments, the NAN devices indicate their availability in the WUR. Such availability information may comprise a WUR schedule, i.e. indicate time windows during which the NAN device is capable to transfer a wake-up frame. Thus, the devices may obtain time periods for WUR communications for use in the NDL, which may be referred to as WUR CRBs. The time schedule may define start time and duration of a potential availability window. The WUR availability may be indicated in the NDL schedule setup 400. A specific WUR Availability attribute may be specified in NAN SDFs for this purpose. Similarly to the NDL schedule setup, the NAN devices may indicate their WUR availability (potential, conditional, committed). Once they have the NDL Schedule established, they have also the WUR CRBs in place for use with the NDL. The WUR CRBs are essentially the overlapped portions of the two devices' committed WUR availability windows with the same channel. The WUR CRBs are the availability windows during which both the devices know that the peer can be reached with the WUR.

Once the NAN devices operate 402 in the NAN data path using the established NDL schedule, they may request transition to the power save mode in which the NDL CRBs are cancelled until a WUF is transmitted/received. When one of the NAN devices, in the example of FIG. 4 the first device, detects 404 that it has no frames pending for transmission in the NDP, the device may initiate cancellation procedure by transmitting (block 310 in the method of FIG. 3) the control message to the peer (the second device). The control message may be a NAF 406 indicating a pause request, for example. The NAF 406 may be a dedicated NAF for negotiating early closure of CRB(s) of the NDL schedule. With such a control message or request, the first device indicates to the second device that it has no more data to transmit and wishes to enter the power save mode in which the NAN data transfer according to the NDL schedule may be reinstated via the wake-up radio.

Once the second device decides to accept the proposal, e.g. based on lack of data, it transmits a NAF based acknowledgement or response frame 408. The devices then enter 410, 412 the power save mode and become available for each other in the NDP via the WUR. All subsequent NDL CRBs are cancelled during the power save mode (until the WUF ending the power save mode). In another embodiment, transmission of the acknowledgement or response frame 408 is optional.

Once one of the devices detects 414, after one or more S-NDL CRBs since the beginning of the power save mode, the need to transfer over the NDP using the NDL CRBs, the device transmits a WUF 416 to the peer during a WUR CRB. The devices may then transition 418, 420 from the power save mode to the awake mode and activate the main radio, and begin S-NDL CRB communications 422. In an embodiment, only the device that transmitted the control message 406 may transmit the WUF 416. In an embodiment, a subscriber device (first device or second device) may transmit the WUF 416.

The NAN devices that are WUR capable may thus be configured to save power by taking WUR in use for S-NDL, by indicating to each other that they have no more data frames to exchange. The remaining part of the current S-NDL CRB and all the subsequent S-NDL CRBs may then be cancelled until one of them transmits a WUF over the WUR interface to the peer.

It will be appreciated that various additions and modifications may be made to the methods illustrated in FIGS. 3 and 4, some examples being illustrated below. It will be appreciated that the second device may detect the need for data transfer and send 340, 416 the WUF instead of the first device. Further, either the first device or the second device may initiate establishment 300 of the data schedule or the NDL and NDP, and either the first device or the second device may transmit 310, 406 the control message or the NAF to pause the data transmission via the main radio.

In some embodiments, an acknowledgement to the control message 310 is transferred between blocks 310 and 320. The switch from the awake mode to the power save mode may be performed 320 in response to the acknowledgement. Another acknowledgement may be required to be transmitted by the second device upon receiving the WUF from the first device after the block 340. Data transmission may be continued by the first device via the main radio in accordance with the data link schedule in response to receiving such other acknowledgement from the second device.

As already indicated, a data link schedule establishment message and/or the control message may comprise WUR related parameters, or there may be a further message or frame to provide WUR related parameters between the devices. If received WUR related parameter information is acceptable, the (parameter information) receiving device may send the same parameter information back to the sending device. The information may be altered if the receiving device is not capable of providing a requested parameter. Alternatively, the receiving device may send only information that it has received or accepts the parameters. This may be implicit by sending a response without any additional information but only by sending positive response frame accept parameters, or this can be explicit by having a new element included with accept or reject information included.

It is also to be appreciated that there may be more than two devices involved for at least some of the presently illustrated features. For example, all devices in a NAN cluster may be WUR capable and could be triggered to enter 320 the power save mode by the (multicast) control message. Hence, a multicast WID may be communicated during the data link schedule establishment 300 and the WUF may be transmitted to the multicast WID.

The wake-up frame 340 may be a unicast frame or a multicast frame. The wake-up frame may be an unmodified wake-up frame, or a specific scheduled wake-up frame format or information element is used e.g. for the resumption of NAN CRB communications.

Figure 5:
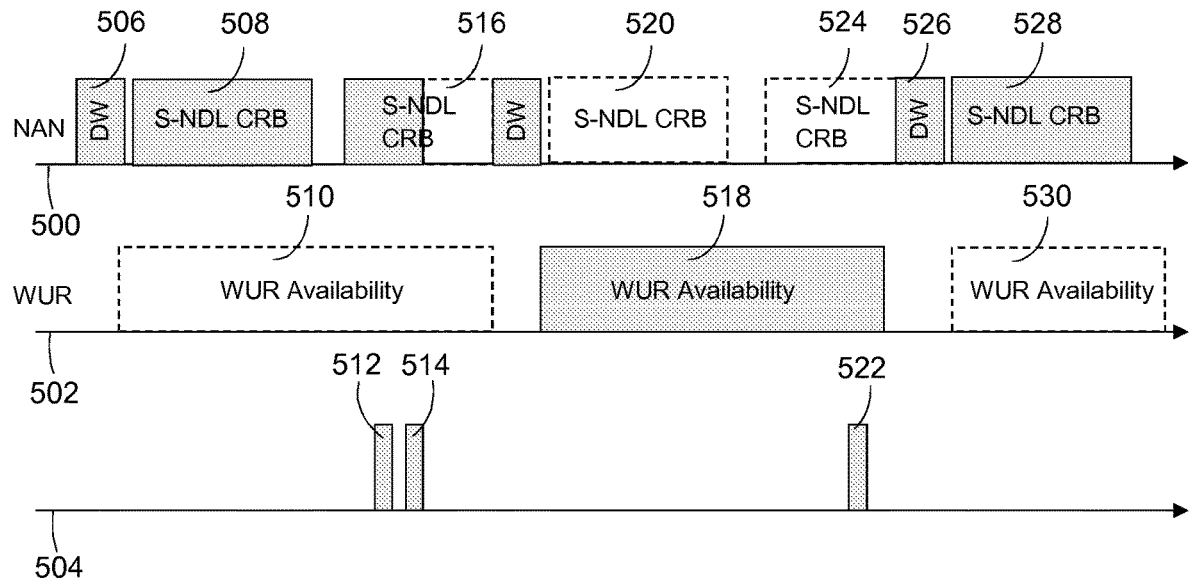
FIGS. 5 and 6 illustrate communication resource usage examples in accordance with at least some embodiments of the present invention.

FIG. 5 illustrates time-aligned lines for NDL schedule 500, WUR availability 502 and NAN and WUR signalling 504 related to the power mode switch. For example, NDL and NDP may be setup by using the DW 506, on the basis of which there are scheduled S-NDL CRBs 508, 516, 520, 524, and 528 and WUR availability windows or WUR CRBs 510, 518, and 530. Grey areas illustrate availability of a given resource, e.g. the CRB 508 is completely available for S-NDL data transfer whereas CRB 520 is not. Transmissions 512, 514 represent the control message 320 or the NAFs 406 and 408 during the available S-NDL CRB 516 to enter the power save mode. It is further illustrated that after the NAF 514 the remaining portion of the CRB 516 and subsequent S-NDL CRBs 520, 524 are cancelled. Thus, the presently disclosed application of the WUR enables that the main radio does not have to be activated in the power save mode periodically at every CRB or a paging window of every CRB to be able to detect if the peer device has something to send. The WUF 522 triggers reinstatement of the S-NDL CRB 528 for NAN communications via the main radio.

In some embodiments the NDL CRBs are taken in use 422 starting from the first (entire) S-NDL CRB 528 after the WUF 522 and scheduled to start no earlier than the wake-up delay (not shown) after the end of the WUF 522. In an alternative implementation, an NDL CRB may be taken in use in the middle of the scheduled CRB 524. If the wake-up delay from the end of a transmitted/received WUF expires in the middle of a cancelled S-NDL CRB, that S-NDL CRB may be a committed CRB.

In some embodiments, the WUR CRBs are in effect and valid only once the devices have agreed on cancelling the NDL CRBs by exchange of the dedicated NAFs. The WUR CRBs may remain in effect or valid until transmission/ reception of a WUF to/from the peer after which the WUR CRBs become potential WUR availability windows until the devices again agree on NDL CRB cancellation. FIG. 5 illustrates an example of the case in which the WUR CRBs 510, 530 are not valid while the S-NDL CRBs 508, 516, and 528 are in use, the WUR CRB 518 is taken into use 518 upon successful NAF exchange by 512, 514.

Figure 6:
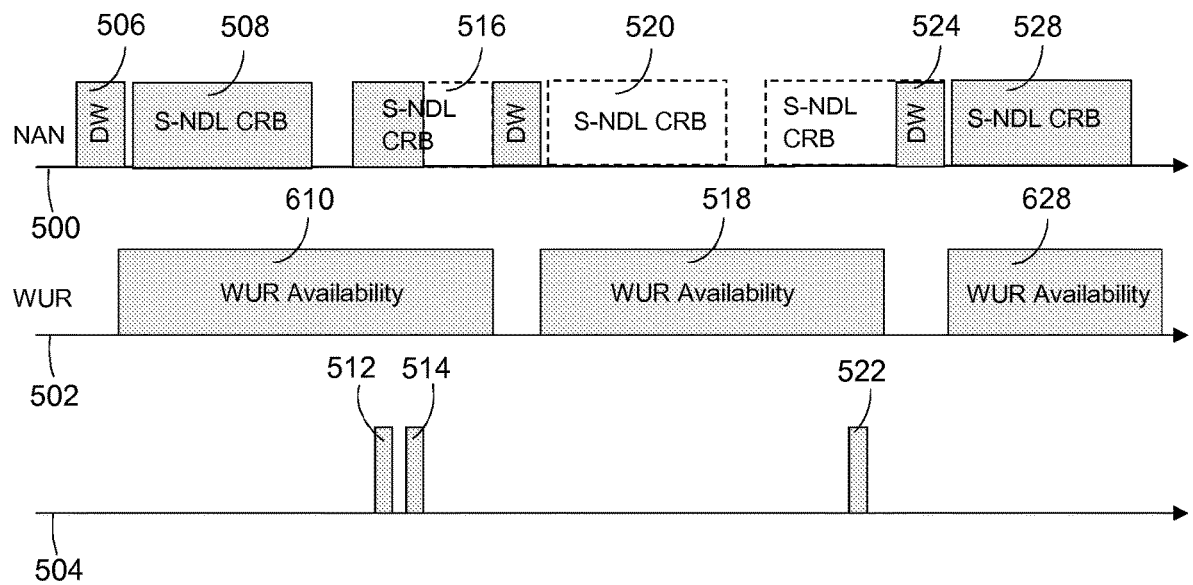

In an alternative embodiment, the devices are committed to be available in the WUR per the WUR CRBs independently from the NDL CRB state. FIG. 6 illustrates similar message sequence example as FIG. 5 of an implementation in which WUR CRBs 610, 628 are in effect also at the time when NDL CRBs 508, 516, and 528 are in effect. Also in FIG. 6 an S-NDL CRB may be taken into use at the beginning of the CRB and thus the timing of the WUF does not matter as long as it is transmitted early enough to allow the wake-up delay to expire before the start of the CRB. In another embodiment, the WUF may be transmitted even during the NDL CRB and thus the NDL CRB may become into use later than in the beginning of the NDL CRB. As mentioned earlier, in an embodiment WUR may be on and available all the time.

While some embodiments have been described in the context of IEEE 802.11 based system, it should be appreciated that these or other embodiments of the invention may be applicable in connection with other technologies, such as with main radios operating according to other versions of the IEEE 802.11, WiMAX (Worldwide Interoperability for Microwave Access), UMTS LTE (Long-term Evolution for Universal Mobile Telecommunication System), LTE-Advanced, or a fifth generation cellular communication system (5G). Some embodiments may be applicable to networks having features defined by the IEEE 802.19.1 working group.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a wearable device, a base station, access point device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 7:
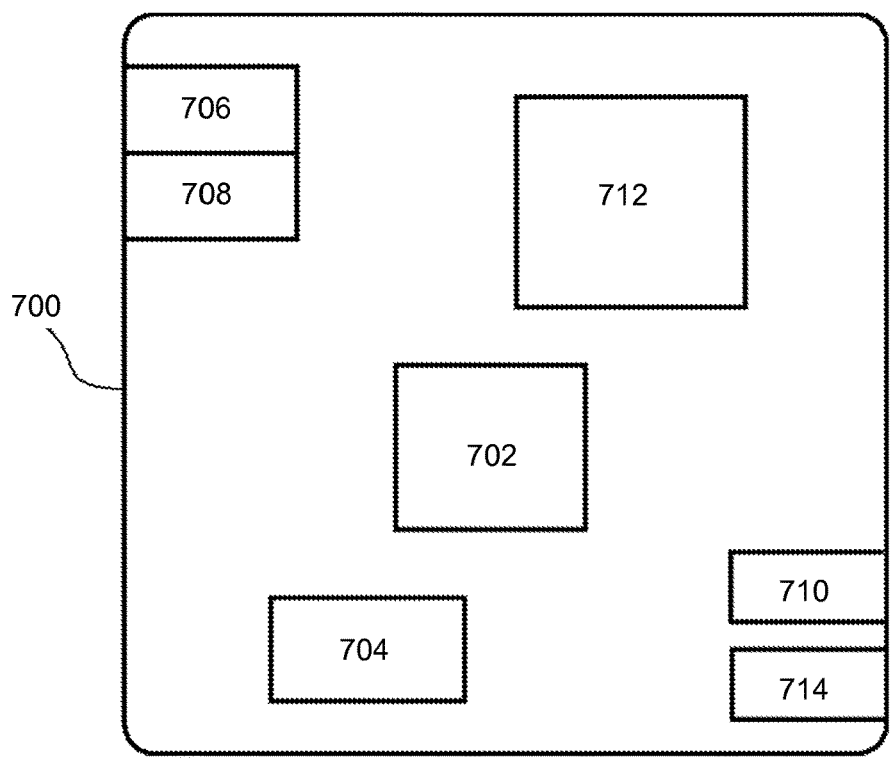
FIG. 7 illustrates an example apparatus capable of supporting at least some embodiments of the present invention.

FIG. 7 illustrates an example apparatus capable of supporting at least some embodiments of the present invention. Illustrated is a device 700, which may comprise a communication device, such as a device 100, 110, 130, 200 illustrated above. The device may include wake-up radio functionality in accordance with at least some of the embodiments illustrated above. For example, the device 700 may be configured to perform at least some of the features illustrated in connection of FIG. 3, and at least some of the further embodiments thereof.

Comprised in the device 700 is a processor 702, which may comprise, for example, a single- or multi-core processor wherein a single-core processor comprises one processing core and a multi-core processor comprises more than one processing core. The processor 702 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 700 may comprise memory 704. The memory may comprise random-access memory and/or permanent memory. The memory may comprise at least one RAM chip. The memory may comprise solid-state, magnetic, optical and/or holographic memory, for example. The memory may be at least in part accessible to the processor 702. The memory may be at least in part comprised in the processor 702. The memory 704 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 700 but accessible to the device. According to an aspect, when the processor 702 executes computer program code stored in the memory 704, the computer program code causes the apparatus to carry out the functionalities according to any one of the embodiments of FIGS. 3 to 6.

The device 700 may comprise a main radio 706 and a wake-up radio 708. The main radio 706 and the WUR 708 may comprise well-known radio interface components, such as an amplifier, filter, frequency-converter, (de)modulator, and encoder/decoder circuitries and one or more antennas. The main radio 706 and the WUR 708 may be configured to operate in accordance with at least one cellular or non-cellular standard. The main radio comprises at least one transmitter and at least one receiver. The WUR 708 comprises a receiver and/or transmitter. The radios 706, 708 may comprise analogue radio communication components and digital baseband processing components for processing transmission and reception signals. The main radio 706 may support multiple modulation formats, whereas the WUR 708 may support a single modulation scheme only, e.g. the on-off keying. The main radio 706 may be configured to operate in accordance with long term evolution, LTE, WLAN, and/or worldwide interoperability for microwave access, WiMAX, standards, for example.

The WUR 708 may be configured to operate according to IEEE 802.11 based WUR, for example. The WUR may be configured to receive and extract WUFs transmitted by a wake-up radio of another device, such as the AP 110, another STA 130 or the NAN device 200. The WUR may be capable of decoding the wake-up frames on its own without any assistance from the main radio. The WUR may thus comprise, in addition to a radio frequency front-end receiver components, digital baseband receiver components and a frame extraction processor capable of decoding contents of a wake-up frame. The WUF may comprise a destination address field indicating a STA that should wake up the main radio. The frame extraction processor may perform decoding of the destination address from a received wake-up frame and determine whether or not the destination address is an address of the STA of the frame extraction processor.

If yes, it may output a wake-up signal causing the main radio to wake up for radio communication as illustrated above.

The device 700 is in some embodiments configured to operate as a NAN device. Thus, the device 700 may comprise a NAN engine comprising a NAN Discovery Engine, a NAN Data Engine, a NAN Scheduler, NAN medium access control (MAC) on IEEE 802.11 physical layer, and NAN APIs to services/applications. Service queries and responses are processed by a NAN Discovery Engine. A NAN Scheduler is responsible for establishing, maintaining, and terminating Wi-Fi radio resource schedules for NAN operations. A NAN Data Engine provides the NDL capability that is used to setup a data link between NAN Devices. A NAN Device may operate concurrently in a NAN network and in other types of Wi-Fi networks such as WLAN Infrastructure, IBSS, and/or Wi-Fi Direct. Such NAN Concurrent Device supports multiple MAC entities: one MAC entity operating as a WLAN STA and the other MAC entity operating as a NAN Device.

The device may comprise at least one controller controlling the main radio 706 and/or the WUR 708 wake-up radio functions according to presently disclosed embodiments. In particular, the controller may be arranged to cause at least some of the operations illustrated in connection with FIGS. 3 to 6, but may also be controlling other radio operations. The controller may be implemented by the processor 702, for example.

The device 700 may comprise one or more further radios 710, such as a transceiver for cellular communication and/or a near-field communication, NFC, transceiver. A further cellular radio may operate in accordance with global system for mobile communication, GSM, wideband code division multiple access, WCDMA, IS-95, LTE, or 5G, for example. The NFC transceiver may support at least one NFC technology, such as NFC, Bluetooth, Wibree or similar technologies.

The device 700 may comprise user interface, UI, 712. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 704 or on a cloud accessible via the main radio 706, or via the further radio 710, and/or to play games.

The device 700 may comprise or be arranged to accept a user identity module or other IC module 714. The user identity module may comprise, for example, a subscriber identity module, SIM, card installable in the device 700. The user identity module 714 may comprise information identifying a subscription of a user of device 700. The user identity module 714 may comprise cryptographic information usable to verify the identity of a user of device 700 and/or to facilitate encryption of communicated information and billing of the user of the device 700 for communication effected via the device 700.

The processor 702 may be furnished with a transmitter arranged to output information from the processor, via electrical leads internal to the device 700, to other devices comprised in the device. Such a transmitter may comprise a serial bus transmitter arranged to, for example, output information via at least one electrical lead to memory 704 for storage therein. Alternatively to a serial bus, the transmitter may comprise a parallel bus transmitter. Likewise the processor may comprise a receiver arranged to receive information in the processor, via electrical leads internal to the device 700, from other devices comprised in the device 700. Such a receiver may comprise a serial bus receiver arranged to, for example, receive information via at least one electrical lead from the radio 706, 708 for processing in the processor. Alternatively to a serial bus, the receiver may comprise a parallel bus receiver.

The device 700 may comprise further devices not illustrated in FIG. 7. For example, the device may comprise at least one digital camera. Some devices 700 may comprise a back-facing camera and a front-facing camera. The device may comprise a fingerprint sensor arranged to authenticate, at least in part, a user of the device. In some embodiments, the device lacks at least one device described above. For example, some devices may lack the further radio 710 and/or the user identity module 714.

The processor 702, the memory 704, the main radio 706, the WUR 708, the further radio 710, the UI 712 and/or the user identity module 714 may be interconnected by electrical leads internal to the device 700 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communications.

Acronyms List

AID Association identifier
AP Access point
ASIC Application-specific integrated circuit
BSS Basic service set
CRB Common resource block
DW Discovery window
ESS Extended service set
FPGA Field-programmable gate array
GAS Generic advertisement service
GSM Global system for mobile communication
LP-WUR Low-power WUR
LTE Long term evolution
M2M Machine to machine
NAF NAN action frame
NAN Neighbor Awareness Networking
NDL NAN data link
NDP NAN data path
NFC Near-field communication
NMS Network management system
PCR Primary connectivity radio
SDF Service discovery frame
STA Station
UI User interface
WCDMA Wideband code division multiple access
WID Wake-up identifier
WiMAX Worldwide interoperability for microwave access
WLAN Wireless local area network
WUR Wake-up radio
WUF Wake-up frame

The invention claimed is:

1. An apparatus comprising at least one processor, at least one memory including computer program code, the at least one memory and the computer program code being configured to, with the at least one processor, cause the apparatus at least to:
    establish, via a main radio, a data link schedule comprising a plurality of communication resource periods for a data link between a first wireless device and a second wireless device, wherein at least a sub-set of the plurality of communication resource periods are scheduled to start periodically;
    pause data transmission by transferring, via the main radio, a control message during a communication resource period of the data link schedule;
    enter a power save mode in response to transferring the control message;
    maintain the power save mode over at least one further communication resource period of the data link schedule; and
    transmit a wake-up frame, via a wake-up radio different from the main radio, in response to detecting need for further data transmission during the data link schedule.

2. The apparatus of claim 1, wherein the at least one memory and the computer program code is configured to, with the at least one processor, further cause the apparatus to transfer end user data during at least one communication resource period of the plurality of communication resource periods.

3. The apparatus of claim 1, wherein the at least one memory and the computer program code is configured to, with the at least one processor, further cause the apparatus to enter the power save mode before end of the communication resource period.

4. The apparatus of claim 1, wherein the at least one memory and the computer program code is configured to, with the at least one processor, further cause the apparatus to transmit, to the second device, the wake-up frame before a still further communication resource period of the data link schedule in response to detecting the need for further data transmission during the data link schedule, and
    continue data transmission via the main radio in accordance with the data link schedule after transmitting the wake-up frame.

5. The apparatus of claim 1, wherein the communication resource period has a start time, duration, and a frequency channel.

6. The apparatus of claim 1, wherein the first wireless device and the second wireless device are neighbor awareness networking devices.

7. The apparatus of claim 6, wherein the data link schedule is a neighbor awareness networking data link schedule and the communication resource period is a communication resource block.

8. The apparatus of claim 1, wherein the at least one memory and the computer program code is configured to, with the at least one processor, further cause the apparatus to switch off the main radio during the power save mode.

9. The apparatus of claim 1, wherein the control message is an action frame indicating a pause request or an acknowledgement or a response to an action frame indicating a pause request.

10. The apparatus of claim 1, wherein a message used for establishing the data link schedule comprises an indication of wake-up radio availability and a wake-up radio identifier for transferring the wake-up frame.

11. The apparatus of claim 1, wherein the apparatus is the first wireless device.

12. A method performed by a first wireless device comprising:
    establishing, via a main radio, a data link schedule comprising a plurality of communication resource periods for a data link between the first wireless device and a second wireless device, wherein at least a sub-set of the plurality of communication resource periods are scheduled to start periodically;

pausing data transmission by transferring, via the main radio, a control message during a communication resource period of the data link schedule;

entering a power save mode in response to transferring the control message;

maintaining the power save mode over at least one further communication resource period of the data link schedule; and transmitting a wake-up frame, via a wake-up radio different from the main radio, in response to detecting need for further data transmission during the data link schedule.

13. The method of claim 12, further comprising:

transferring end user data during at least one communication resource period of the plurality of communication resource periods.

14. The method of claim 12, wherein the power save mode is entered before end of the communication resource period.

15. The method of claim 12, wherein the wake-up frame is transmitted before a still further communication resource period of the data link schedule in response to detecting the need for further data transmission during the data link schedule, and data transmission is continued via the main radio in accordance with the data link schedule after transmitting the wake-up frame.

16. The method of claim 12, wherein the communication resource period has a start time, duration, and a frequency channel.

17. The method of claim 12, wherein the first wireless device and the second wireless device are neighbor awareness networking devices; and wherein the data link schedule is a neighbor awareness networking data link schedule and the communication resource period is a communication resource block.

18. The method of claim 12, wherein the main radio is switched off during the power save mode.

19. The method of claim 12, wherein the control message is an action frame indicating a pause request or an acknowledgement or a response to an action frame indicating a pause request.

20. An apparatus comprising at least one processor, at least one memory including computer program code, the at least one memory and the computer program code being configured to, with the at least one processor, cause the apparatus at least to:

establish, via a main radio, a data link schedule comprising a plurality of communication resource periods for a data link between a first wireless device and a second wireless device, wherein at least a sub-set of the plurality of communication resource periods are scheduled to start periodically;

transfer, via the main radio, a control message during a communication resource period of the data link schedule for pausing data transmission during at least one subsequent communication resource period of the data link schedule;

enter a power save mode in response to receiving the control message;

maintain in the power save mode over at least one communication resource period of the plurality of communication resource periods; and continue data transmission in accordance with the data link schedule in response to receiving a wake-up frame, via a wake-up radio different from the main radio.

* * * * *